United States Patent Office 2,886,571
Patented May 12, 1959

2,886,571
PROCESS OF PREPARING 3-THIAZOLINES

Hubert Schade and Max Thiel, Leuna, Germany, assignors to VEB Leuna-Werke "Walter Ulbricht," Leuna, Germany No Drawing. Application March 5, 1958
Serial No. 719,200

Claims priority, application Germany March 13, 1957

15 Claims. (Cl. 260—306.7)

This invention relates to a process for preparing heterocyclic organic compounds containing sulfur and nitrogen, and more particularly to a process for preparing 3-thiazolines.

It is known that 3-thiazolines can be prepared either by concomitant reaction of elementary sulfur and gaseous ammonia with ketones (F. Asinger, M. Thiel and co-workers, Ann. 602, 37–49 (1957); 606, 67–74 (1957); 610, 25 (1957); see also C.A. 51, 12073g (1957); 52, 1175a (1958), or by the action of ammonia on a mixture of a 2-ketomercaptan with a carbonyl compound (F. Asinger, M. Thiel, G. Esser, Ann. 610, 33 (1957)).

It has now been found that 2,5,5-trialkyl-substituted 3-thiazolines can be prepared from alkylidene vinylamines and elementary sulfur. Such alkylidene vinylamines may be obtained in a known manner by the reaction of ammonia with aldehydes having a carbon chain which is branched at the α-carbon atom (Beilstein 4, 221; U.S. Patent 2,319,848). Isobutyraldehyde, for example, reacts with ammonia to form 1 butylidene-β,β'-dimethylvinylamine. The reaction is generally represented by the following equation:

EQUATION 1

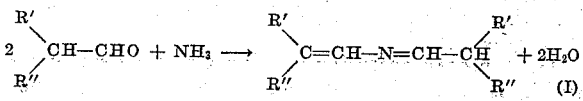

Substituted vinylamines of the type of compound (I) react with sulfur to form 3-thiazolines by combining one mol of amine with one gram atom of sulfur according to the general equation,

EQUATION 2

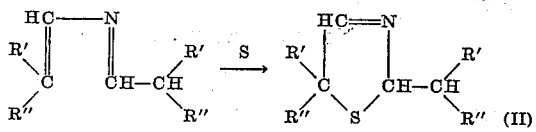

wherein R' and R'' generally represent alkyl radicals. The reaction of the alkylidene vinylamines (I) with sulfur is preferably performed at temperatures between 100 and 150° C. The yield of desirable end products drops at lower temperatures and a higher percentage of resinous substances of high molecular weight is formed at higher temperatures.

3-thiazolines may also be prepared by replacing elementary sulfur in the aforedescribed reaction by a solution of a polysulfide. This procedure has the added advantage that the reaction of alkylidene vinylamine (I) with polysulfide starts already at room temperature. The reaction is exothermic and the reaction proceeds at increasing temperature until it comes to completion at a temperature still below 100° C.

It has furthermore been found that the synthesis of the aforedescribed 3-thiazolines may be performed with aldehydes having a carbon chain branched at the α-carbon atom serving as the starting material. Two mols of aldehyde are mixed with one gram atom of sulfur and gaseous ammonia is passed into the mixture. The alkylidene vinylamine (I) is formed according to Equation 1 together with water which is removed by distillation. During subsequent heating to 100–150° C. Reaction 2 takes place and a 3-thiazoline (II) is formed. Sulfur may be replaced in this procedure by a polysulfide solution.

A second compound of substantially higher boiling point is found together with the 3-thiazoline in the reaction mixture in all cases. The yield of the second compound varies. It also contains sulfur and nitrogen and has twice the molecular weight of the 3-thiazoline formed according to equation 2. The structure of these by-products has not yet been fully ascertained. Their empirical formula was determined by analysis as being $(R',R'')_4C_8H_4N_2S_2$.

Mixtures of aldehydes having carbon chains branched at the α-carbon atom may be equally reacted to form alkylidene vinylamines. Such a mixture may be prepared, for example, by dehydrogenation of higher boiling fractions of the distillation residue in the manufacture of isobutyl alcohol. The alkylidene vinylamines prepared from these mixed aldehydes with ammonia are capable of reacting with elementary sulfur or with a polysulfide solution and to form 3-thiazolines under the operating conditions described above.

The following examples are further illustrative of the present invention, and it will be understood that the invention is not limited thereto:

Example 1

800 g. of isobutylidene-β,β-dimethylvinylamine are heated with 205 g. of sulfur to 150° C. for 4 hours. The reddish brown reaction product is fractionated in a vacuum. A yield of 400 g. of 2-isopropyl-5,5-dimethyl-3-thiazoline is obtained. The compound has a boiling point of 55–56° C. at 5 mm. Hg and forms a picrate having a melting point of 116° C. 280 g. of a compound of B.P.$_5$ 115° C. are obtained. The second compound has the empirical formula $C_{16}H_{28}N_2S_2$.

Example 2

600 g. of α-methyl-α-propylethylidene - β - methyl - β-propyl-vinylamine and 140 g. of sulfur are heated as described in Example 1 and the reaction product is separated by fractional distillation. More than 400 g. of 2-(pentyl-2)-5-methyl-5-propyl-3-thiazoline are obtained. The material has a boiling point of 90° C. at 3 mm. Hg. More than 290 g. of a higher boiling second compound are obtained and have a boiling point of 150° C. at 3 mm. Hg.

Example 3

Gaseous ammonia is passed through a mixture of 1704 g. isobutyraldehyde and 384 g. of sulfur. The reaction temperature increases and then remains constant for several hours. When the reaction is completed, the temperature drops. Ammonia is continually passed until the reaction mixture returns to ambient temperature. The mass is then gradually heated to drive off the water of condensation. The residue is heated for three hours at 150° C. The resulting reddish-brown mixture is separated by fractional distillation in a vacuum. More than 800 g. of 2-isopropyl-5,5-dimethyl-3-thiazoline are obtained and have a boiling point of 55–56° C. at 5 mm. Hg. The compound forms a picrate of M.P. 116° C. The reaction mixture also yields more than 350 g. of a higher-boiling substance having a boiling point of 115° C. at 5 mm. Hg and an empirical formula of $C_{16}H_{28}N_2S_2$.

Example 4

To 700 cc. of an aqueous ammonium polysulfide solution containing 250 g. of polysulfide sulfur per liter 576 g. isobutyraldehyde are added while ammonia is passed and the mixture is stirred vigorously. The temperature rises to approximately 70° C. After the exothermic reaction subsides, the reaction mixture is held for one hour longer at this temperature by heating. Two layers form in the reaction vessel. The lower, aqueous layer is discarded. The upper layer is fractionated in a vacuum. It yields over 300 g. of 2-isopropyl-5,5-dimethyl-3-thiazoline boiling at 65–70° C. at 10 mm. Hg.

*Example 5*

865 g. of isobutylidene-β,β-dimethylvinylamine and 900 g. of an ammonium sulfide solution containing 250 g. of polysulfide sulfur per liter are mixed and the mixture is vigorously agitated. The temperature rises beyond 50° C. As soon as the temperature starts dropping, the mixture is heated and held for one hour at 70° C. Two layers are formed in the reaction vessel. The lower, aqueous layer is discarded, the upper layer is fractionated in a vacuum and yields more than 600 g. of 2-isopropyl-5,5-dimethyl-3-thiazoline having a boiling point of 45–46° C. at 2.5 mm. Hg.

*Example 6*

A mixture of alkylidene vinylamines is prepared with ammonia from the products of dehydrogenation of the $C_7$–$C_9$ fraction obtained as a by-product in the manufacture of isobutyl alcohol. 600 g. of this mixture are heated to 150° C. for three hours in the presence of 90 g. of sulfur. The reaction product is fractionally distilled in a vacuum. 350 g. of a mixture of 3-thiazolines having a boiling range of 130–136° C. at 4 mm. Hg is obtained.

While ammonium polysulfide is the preferred source of polysulfide sulfur for the process of the invention, it will be apparent to those skilled in the art that any water-soluble sulfur compound adapted to bind additional sulfur by co-valence bonds is suitable for the purpose of this invention and the use of such compounds is specifically contemplated.

While the invention has been described with particular reference to specific embodiments, it is to be understood that it is not limited thereto, but is to be construed broadly and restricted solely by the scope of the appended claims.

What is claimed is:

1. A process for the preparation of 2,5,5-trialkyl-substituted 3-thiazolines which comprises reactiing an alkylidenevinylamine of the general formula

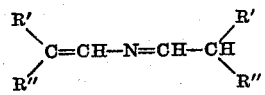

wherein R′ and R″ represent alkyl radicals, with sulfur at a temperature substantially between room temperature and 150° C.

2. A process as set forth in claim 1, wherein said alkylidenevinylamine and said sulfur are reacted in a proportion of substantially one mol of said alkylidenevinylamine to one gram atom of sulfur.

3. A process as set forth in claim 1, wherein said sulfur is elementary sulfur and said temperature is substantially between 100 and 150° C.

4. A process as set forth in claim 1, wherein said sulfur is polysulfide sulfur in an aqueous polysulfide solution and said temperature is substantially between room temperature and 100° C.

5. A process for the preparation of 2,5,5-trialkyl-substituted 3-thiazolines which comprises reacting a saturated aliphatic hydrocarbon aldehyde with ammonia and sulfur, said aldehyde being a branched chain aldehyde carrying chains which branch from the carbon atom adjacent the aldehyde group.

6. A process as set forth in claim 5, wherein said aldehyde and said sulfur are reacted in a proportion of substantially two mols of said aldehyde to one gram atom of said sulfur.

7. A process as set forth in claim 5, wherein said aldehyde and said sulfur are mixed and said ammonia is passed into the mixture so produced, and the resulting reaction product is heated to a temperature of substantially between room temperature and 150° C.

8. A process as set forth in claim 7, wherein said sulfur is elementary sulfur and said temperature is substantially between 100 and 150° C.

9. A process as set forth in claim 7, wherein said sulfur is polysulfide sulfur in an aqueous polysulfide solution and said temperature is substantially between room temperature and 100° C.

10. A process according to claim 2 wherein said sulfur is elementary sulfur and said temperature range is substantially between 100° and 150° C.

11. A process according to claim 10 wherein said alkylidenevinylamine is isobutylidene-β,β-dimethylvinyl amine.

12. A process according to claim 10 wherein said alkylidenevinylamine is α-methyl-α-propylethylidene-β-methyl-β-propyl-vinylamine.

13. A process according to claim 4 wherein said polysulfide is ammonium polysulfide and said alkylidenevinylamine is isobutylidene-β,β-dimethyl-vinylamine.

14. A process according to claim 8 wherein said aldehyde is isobutyraldehyde.

15. A process according to claim 9 wherein said polysulfide is ammonium polysulfide and aldehyde is isobutyraldehyde.

No references cited.